United States Patent [19]

Kanai et al.

[11] Patent Number: 5,161,075
[45] Date of Patent: Nov. 3, 1992

[54] HUB TABLE FOR A MAGNETIC DISK DRIVE DEVICE

[75] Inventors: Takashi Kanai; Kunio Miyazaki; Masayuki Tsuzuku, all of Komagane, Japan

[73] Assignee: Kabushiki Kaisha Sankyo Seiki Seisakusho, Nagano, Japan

[21] Appl. No.: 727,384

[22] Filed: Jul. 5, 1991

Related U.S. Application Data

[63] Continuation of Ser. No. 413,735, Sep. 28, 1989, abandoned.

[30] Foreign Application Priority Data

Sep. 28, 1988 [JP] Japan .................. 63-126706[U]

[51] Int. Cl.$^5$ ............................................. G11B 5/016
[52] U.S. Cl. ................................ 360/99.04; 360/99.08
[58] Field of Search .................. 360/133, 99.04, 99.05, 360/99.08, 99.11, 99.12, 135, 98.07, 98.08; 369/270

[56] References Cited

U.S. PATENT DOCUMENTS

| | | | |
|---|---|---|---|
| 4,623,570 | 11/1986 | Alexander et al. | 360/135 X |
| 4,654,733 | 3/1987 | Kawakami et al. | 360/133 X |
| 4,694,370 | 9/1987 | Ommori et al. | 360/135 X |
| 4,758,915 | 7/1988 | Sakaguchi | 360/99.04 |
| 4,896,232 | 1/1990 | Sugawara | 360/99.04 |
| 4,989,107 | 1/1991 | Tsukahara | 360/99.08 |

FOREIGN PATENT DOCUMENTS 0175079 10/1984 Japan ................................. 369/270

*Primary Examiner*—Andrew L. Sniezek
*Attorney, Agent, or Firm*—Jones, Tullar & Cooper

[57] ABSTRACT

A magnetic disk device, where a slip pad is adhered on a hub table secured to a spindle, is disclosed, in which the hub table has a circular groove portion formed in the disk hub attracting surface portion coaxially to the spindle and at least a part of the outer peripheral portion of the slip pad is installed in the groove portion.

14 Claims, 2 Drawing Sheets

HUB TABLE FOR A MAGNETIC DISK DRIVE DEVICE

This application is a continuation of application Ser. No. 07/413,735, filed Sep. 28, 1989, now abandoned.

FIELD OF THE INVENTION

The present invention relates to a floppy disk driving device, and in particular to the construction of a hub table therefor.

BACKGROUND OF THE INVENTION

One type of floppy disk driving device is known, in which a slip pad is adhered to a hub table which in turn is secured to a spindle. The metallic disk hub of a floppy disk is magnetically attracted and held through this slip pad so that the floppy disk is driven to be rotated by rotating the spindle.

FIGS. 6 and 7 show an example of the type described above of floppy disk driving devices. In FIGS. 6 and 7, a hub table 12 is secured to a spindle 11 driven to be rotated by a motor and a slip pad 15 is adhered to the upper surface of the hub table, surrounding the spindle 11. The hub table 12 is made of resin magnet as a whole and magnetized, or a ring-shaped permanent magnet is buried in the hub table 12. In this way, the metallic disk hub of a floppy disk is attracted toward the hub table 12 so as to hold the disk hub through the slip pad 15. A hole 13 is formed in the hub table 12 at a position near the periphery. As well known, a plate spring is mounted on the lower surface of the hub table 12 and a driving pin fixed on this plate spring stands on the upper surface of the hub table 12 through the hole 13 stated above, the plate spring and driving driving pin being not shown in the figure. The upper end portion of the spindle 11 protruding from the upper surface of the hub table 12 is inserted in the central hole of the disk hub. Further, the disk hub is brought into and held in a predetermined position by inserting the driving pin stated above in the window hole of the disk hub so that the driving pin, supported on and biased by the leaf spring, adjusts the position of the disk hub and in this positioning state the disk hub and the floppy disk mounted integrally therewith are driven to be rotated.

As a prior art example using the slip pad in this way, that described in JP-Patent-A-60-147962 and corresponding U.S. Pat. No. 4,654,733 can be cited. In this prior art example a disk hub attracting magnet disposed separately from the hub table is secured to the hub table.

In a floppy disk driving device having a structure in which a slip pad is adhered on the disk hub attracting side of the hub table, the contacting surfaces of the disk hub and the slip pad should both be smooth. If these contacting surfaces are not smooth, the rotational torque therebetween is increased, when the disk hub is set on the slip pad, which gives rise to an inconvenience that the disk hub is not set smoothly on the hub table.

Further, the inventors have found that the conventional floppy disk driving device involves the following problem; namely, that adhesive is pressed out from the outer periphery of the slip pad, and such pressed out adhesive adheres on the disk hub attracting surface of the hub table. This adhesive prevents a smooth contact between the contacting surfaces of the disk hub and the slip pad and increases the rotational torque between the disk hub and the slip pad. The biasing force of the leaf spring is not large enough for the driving pin to adjust the position of the disk, so that the disk hub cannot be set smoothly on the hub table.

There was another problem that, when the slip pad is fabricated by punching, the periphery of the pad has a tendency to be bent in the punching direction so that, when it is adhered on a plane, the resulting surface will not be even so that, when a disk is mounted thereon, it cannot be parallel to the plane.

OBJECT OF THE INVENTION

An object of the present invention is to solve the problems of the techniques described above and thus is to provide a floppy disk device, in which the smoothness of the contacting surfaces of the disk hub and the slip pad is maintained by the fact that, even if the adhesive for the slip pad is pressed out from the outer periphery of the slip pad, the adhesive is not pressed out on the disk hub attracting surface so that the disk hub is set smoothly on the hub table. Further, the disk can be precisely set by the fact that any downturned portion produced by bending of the periphery of the slip pad, for example, during a punching operation, is installed in a groove formed in the slip pad supporting hub table.

SUMMARY OF THE INVENTION

In order to achieve the above object, a magnetic disk device according to the present invention, in which a metallic disk hub disposed at the center of a flexible magnetic disk is attracted so that the magnetic disk is driven to be rotated in unison with a spindle hub, is characterized in that it comprises a spindle to which the spindle hub is secured. An attracting magnet disposed on the spindle hub provides a magnetic surface at least on the side thereof which contacts the disk hub, and a slip pad is disposed on the spindle hub on the surface thereof which contacts the disk hub. A groove, in which at least a part of the slip pad is installed, is formed in the spindle hub on the contacting surface which contacts the disk hub.

DETAILED DESCRIPTION

Hereinbelow an embodiment of the floppy disk driving device according to the present invention will be explained, referring to FIGS. 1 to 5.

Figure 1:
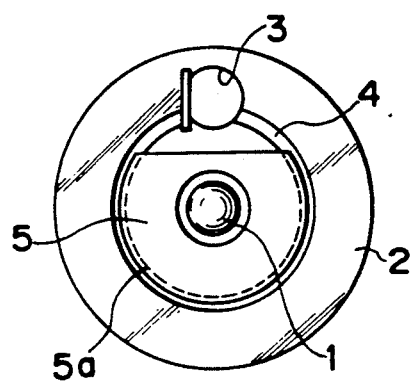
FIG. 1 is a plan view of an embodiment of the floppy disk driving device according to the present invention.
Figure 2:
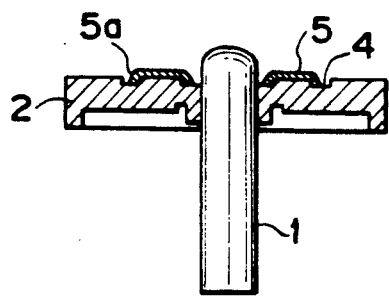
FIG. 2 is a longitudinal cross-sectional view of the same embodiment.

In FIGS. 1 and 2, a hub table 2 is secured to the upper end portion of a spindle 1 driven to be rotated by a motor by inserting it with pressure in the central hole thereof. The hub table 2 is made of resin magnet material and is a unitary body which is magnetized so that a metallic disk hub will be magnetically attracted and held. The upper side of the hub table 2 (as viewed in FIG. 2) is the disk hub attracting side and a circular groove 4 is formed in the upper surface of this disk hub attracting side coaxially with respect to the spindle 1. A slip pad 5 is adhered also to the upper surface of the disk hub attracting side of the hub table 2 so as to surround the spindle 1. The upper slip pad 5 can be a sheet made of Teflon (trade mark). Any suitable method can be selected for adhering the slip pad 5. For example, an adherent sheet, on which silicone adhesive is applied to both surfaces, may be adhered to one side of the slip pad stated above, a board with a removable protective sheet being adhered on the other side of the adherent sheet. The protective layer is removed when the slip pad 5 is to be adhered on the hub table 2. When the slip pad 5 is adhered on the hub table 2, most of the outer peripheral portion 5a of the slip pad 5 is installed in the groove portion 4.

Figure 3:
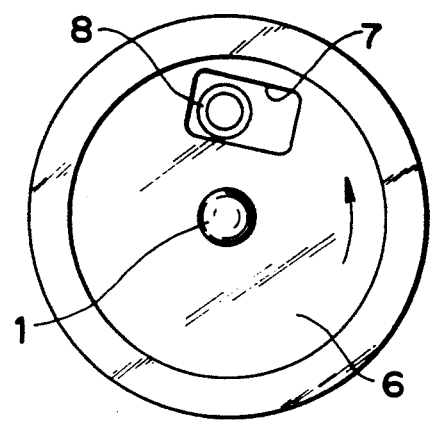
FIG. 3 is a plan view showing the state of use of the same embodiment.

A hole 3 is formed in the hub table 2 at a position near its outer portion. A plate spring is mounted on the lower side of the hub table 2 and a driving pin fixed on this plate spring stands on the upper surface of the hub table 2 through the hole 3. A member indicated by reference numeral 8 in FIG. 3 is the driving pin stated above. The slip pad 5 described above is approximately D-shaped, in which a part of a circle is cut away along a straight line, in order to avoid the hole 3, as illustrated in FIG. 1. An arc-shaped outer peripheral portion, excluding the part cut away along the straight line, is installed in an arc-shaped portion of groove 4.

Figure 4:
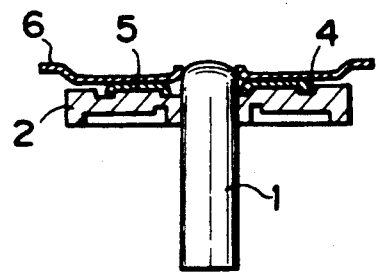
FIG. 4 is a longitudinal cross-sectional view of the state indicated in FIG. 3.

FIGS. 3 and 4 show a state in which a metallic disk hub 6 of a floppy disk is attracted and held by the hub table 2 constructed as described previously. When the metallic disk hub 6 is located on the upper surface of the hub table 2, the table magnetically attracts and holds the disk hub 6 through the slip pad 5. At this time the upper end portion of the spindle 1 protruding from the upper surface of the hub table 2 is inserted in the central hole of the disk hub 6. The disk hub 6 is further positioned by inserting the driving pin 8 stated above in the window hole 7 formed in the disk hub 6. More precisely speaking, the driving pin 8 is driven into a corner of the window hole 7 by the fact that the hub table 2 is driven to be rotated together with the spindle 1 so as to position the disk hub 6. In this positioning state the disk hub 6 and the floppy disk mounted thereon are driven to be rotated in unison.

As described previously, since most of the outer peripheral portion 5a of the slip pad 5 is installed in the groove portion formed in the hub table 2, when the slip pad 5 is adhered on the disk hub attracting surface of the hub table 2, even if some adhesive is pressed out from the outer peripheral portion 5a of the slip pad 5, the pressed out adhesive stays in the groove portion 4 and it is never pressed out onto the disk hub attracting surface. Consequently the smoothness of the contacting surfaces of the disk hub 2 and the slip pad 5 is maintained and the rotating torque between them is reduced. In this way, the disk hub 6 can be set smoothly on the hub table 2.

Furthermore, when a thin slip pad 5 is adhered on the hub table 2, there is a problem that the adhesion position of the slip pad 5 with respect to the spindle 1 is apt to be eccentric. According to the above described embodiment of the present however, even if the adhesion position of the slip pad 5 is eccentric, since the arc-shaped outer peripheral portion 5a of the slip pad 5 will be installed in the groove portion 4 of the hub table 2, the outer peripheral portion 5a of the slip pad 5 will be enclosed by the groove portion 4 so as to form a coaxial arc. In this way, fluctuations in the rotational torque between the disk hub 6 and the hub table 2, when the former is set on the latter, will be eliminated and thus an advantage can be obtained that the disk hub 6 can be set smoothly also regarding this point.

Figure 5:
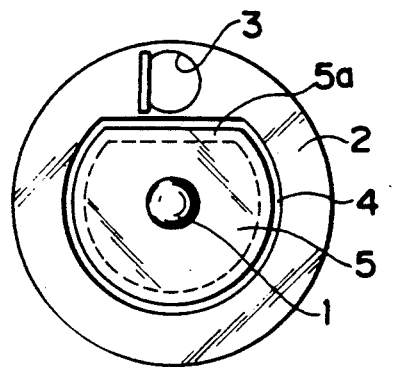
FIG. 5 is a plan view of another embodiment of the floppy disk driving device according to the present invention.
Figure 6:
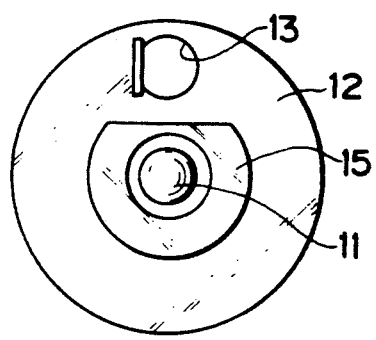
FIG. 6 is a plan view of an example of floppy disk driving devices.
Figure 7:
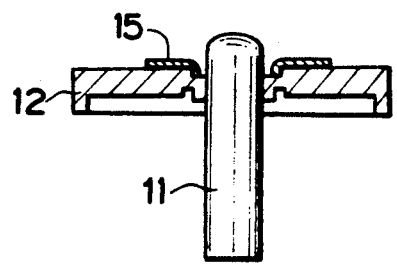
FIG. 7 is a longitudinal cross-sectional view of the example indicated in FIG. 6.

In the embodiment indicated in FIG. 5, the groove portion 4 of the hub table 2 is also formed in an approximately D-shape, fitted to the shape of the slip pad 5. As stated above, the pad 5 is in an approximately D-shape formed by cutting away a part of a circle along a straight line, and the groove is similarly shaped so that the whole outer peripheral portion 5a of the slip pad 5 is installed in the groove portion 4 stated above. In this way, it is possible to prevent the adhesive from being pressed out onto the disk hub attracting surface all around the periphery and a more excellent effect can be obtained.

In another embodiment, a magnet fabricated separately may be secured to the hub table 2 in order to magnetically attract the disk hub.

As explained above, according to the present invention, since at least a part of the outer peripheral portion of the slip pad is installed in the groove portion formed in the hub table, when the slip pad is adhered on the disk hub attracting surface of the hub table, even if adhesive is pressed out from the outer peripheral portion of the slip pad, the pressed out adhesive stays in the groove portion and it is not pressed out on the disk hub attracting surface of the hub table. Consequently the smoothness of the contacting surfaces of the disk hub and the slip pad is maintained and the rotational torque between them is reduced. In the way, this disk hub can be set smoothly on the hub table.

In addition, even if the peripheral portion of the slip pad is more or less bent, it is possible to mount the disk precisely, while keeping the parallelism of the disk mounting surface by adhering the slip pad so as to position the periphery of the slip pad in the groove portion.

What is claimed is:

1. A hub table, comprising:
 a rotatable spindle carrying a spindle hub for rotation therewith, said spindle hub including a contacting surface for receiving a metallic disk hub disposed at the center of a flexible magnetic disk;
 means magnetizing said spindle hub to magnetically attract said metallic disk hub so that said magnetic disk is driven to be rotated in unison with the spindle hub;
 inner and outer grooves formed on said surface, said inner groove being adjacent said spindle and said outer groove being spaced outwardly therefrom; and
 a slip pad having an inner edge and an outer, peripheral edge, said slip pad being adhesively secured to said surface at a location defined by said inner and outer grooves, with said inner edge of said slip pad installed in said inner groove and substantially the entire outer peripheral edge of said slip pad installed in said outer groove.

2. A hub table according to claim 1, wherein the entire inner edge of said slip pad is located in said inner groove.

3. A hub table for a magnetic disk drive device, in which a metallic disk hub disposed at the center of a flexible magnetic disk is attracted magnetically to a spindle hub so that said magnetic disk is driven to be rotated in unison with the spindle hub, comprising:

a rotatable spindle having an axis of rotation, said spindle carrying a spindle hub for rotation therewith, said spindle hub including a top surface for receiving a metallic disk hub;

an inner groove formed in said surface immediately adjacent to said spindle;

an outer groove formed in said surface, said outer groove being spaced from said spindle and spaced from said inner groove and at least a part of said outer groove being concentric with said spindle;

a slip pad having an inner edge and an outer, peripheral edge, said slip pad being secured adhesively to said surface at a location between and defined by said inner groove and by said outer groove, the inner edge of said slip pad being located in said inner groove and adjacent said spindle and substantially all of said outer peripheral edge being installed in said outer groove; and magnetic attracting means provided in said spindle hub to magnetically attract said metallic disk hub.

4. The hub table according to claim 3, wherein said spindle hub is a unitary resin magnet for attracting and holding a metallic disk hub.

5. The hub table according to claim 4, wherein said outer groove is in the form of a circle concentric with said spindle.

6. The hub table according to claim 5, wherein the entirety of said slip pad outer peripheral edge is installed in said outer groove.

7. The hub table according to claim 4, wherein said slip pad is generally D-shaped.

8. The hub table according to claim 7, wherein said outer groove is generally D-shaped, having a circular portion and a straight-line portion, and wherein said circular portion is concentric with said spindle.

9. The hub table according to claim 8, wherein the entirety of said slip pad outer peripheral edge is installed in said D-shaped groove.

10. A hub table according to claim 3 wherein said slip pad has an upper surface which, when said slip pad is adhesively secured to said spindle hub, is higher than said top surface of said spindle hub at a radially outer portion of said spindle hub extending beyond the outer peripheral edge of said slip pad, said disk hub being mounted on said upper surface of said slip pad.

11. A hub table according to claim 3 wherein said slip pad is approximately D-shaped with the straight portion located between said axis of rotation and a disk driving pin insertion hole formed on said spindle hub.

12. A hub table according to claim 3 wherein said slip pad has an upper surface which is higher than the surface of a radially outer portion of said spindle hub extending beyond the outer peripheral edge of said slip pad when said slip pad is adhesively secured to said spindle hub and wherein said disk hub is mounted on the surface of said slip pad, said slip pad being approximately D-shaped and having a straight portion located between said rotating axis and a disk driving pin insertion hole formed on said spindle hub.

13. A hub table according to claim 3, wherein the entire inner edge of said slip pad is located in said inner groove.

14. A hub table according to claim 13, wherein said outer groove is generally D-shaped, having a circular portion concentric with said spindle, and having a straight-line portion, said outer peripheral edge of said slip pad being D-shaped to engage said D-shaped groove.

* * * * *